United States Patent [19]
Meuer et al.

[11] Patent Number: 5,222,576
[45] Date of Patent: Jun. 29, 1993

[54] CENTRAL-LUBRICATION ASSEMBLY

[75] Inventors: Johannes Meuer; Dieter Todtenhaupt; Dieter Schönherr, all of Berlin, Fed. Rep. of Germany

[73] Assignee: Willy Vogel AG, Berlin, Fed. Rep. of Germany

[21] Appl. No.: 819,338

[22] Filed: Jan. 9, 1992

[30] Foreign Application Priority Data
Jan. 10, 1991 [DE] Fed. Rep. of Germany ....... 4100724

[51] Int. Cl.⁵ .............................................. F16N 13/22
[52] U.S. Cl. ..................................... 184/7.4; 184/6.28; 184/7.2; 184/31; 417/310
[58] Field of Search ............... 417/310, 410; 184/6.28, 184/7.4, 7.3, 7.2, 31

[56]  References Cited
U.S. PATENT DOCUMENTS

| | | | |
|---|---|---|---|
| 2,446,730 | 8/1948 | Wemp | 417/310 |
| 3,025,796 | 3/1962 | Miller | 417/310 |
| 3,085,653 | 4/1963 | Thomas | 184/7.2 |
| 3,100,450 | 8/1963 | Svenson | 417/310 |
| 3,146,720 | 9/1964 | Henry | 417/310 |
| 4,400,147 | 8/1983 | Springer et al. | 417/310 |

Primary Examiner—Ira S. Lazarus
Assistant Examiner—Alan B. Cariaso
Attorney, Agent, or Firm—Mark P. Stone

[57] ABSTRACT

In a central-lubrication assembly with a gear pump (3) and with an electric motor (6) connected to the latter via a connecting piece (4), the connecting piece (4) is not only designed as a valve block for a combined pressure-relief and pressure-limiting valve, but also serves as bearings for shaft butts (17, 18) of the gearwheels (19, 20) of the gear pump (3) and furthermore performs the function of a coverplate for the gear pump.

4 Claims, 2 Drawing Sheets

CENTRAL-LUBRICATION ASSEMBLY

BACKGROUND OF THE INVENTION

The invention relates to a central-lubrication assembly for vehicles, with a lubricant pump formed by a gear pump, with a drive motor for the lubricant pump and with a connecting piece arranged between the lubricant pump and the drive motor and equipped with lubricant channels.

DE-B-1,184,659 discloses a central-lubrication assembly of the foregoing type, in which a gear pump located in the vicinity of the bottom of a lubricant reservoir filled with fluid grease is connected to its drive motor via a connecting piece designed as a submerged tube and via an intermediate piece adjoining this. The connecting piece has a lubricant channel which connects the gear pump to a channel leading to a lubricant outlet and to which is assigned a relief valve. The shaft of the driving pump gearwheel is connected to the shaft of the drive motor via an intermediate shaft. The known assembly takes up a comparatively large amount of space and presupposes that the lubricant pump is operated as a submerged pump.

SUMMARY OF THE INVENTION

The object on which the invention is based is to provide a central-lubrication assembly of the generic type taken into consideration, the space requirement and production outlay of which are reduced in that the connecting piece performs additional functions. This object is achieved, according to the invention, in that the connecting piece forms bearings for shaft butts of the gearwheels of the lubricant pump, and in that it furthermore preferably forms one of the coverplates of the lubricant pump.

The central-lubrication assembly according to the invention affords the advantage that its connecting piece not only can receive all the lubricant channels arranged between a lubricant inlet and a lubricant outlet, but also forms part of the lubricant pump and is thus conducive to a compact design of the assembly.

BRIEF DESCRIPTION OF THE DRAWINGS

Further details and features of the invention emerge from the subclaims and from the following description of a preferred exemplary embodiment illustrated in the accompanying drawing. In this:

DESCRIPTION OF THE BEST MODE FOR CARRYING OUT THE INVENTION

Figure 1:
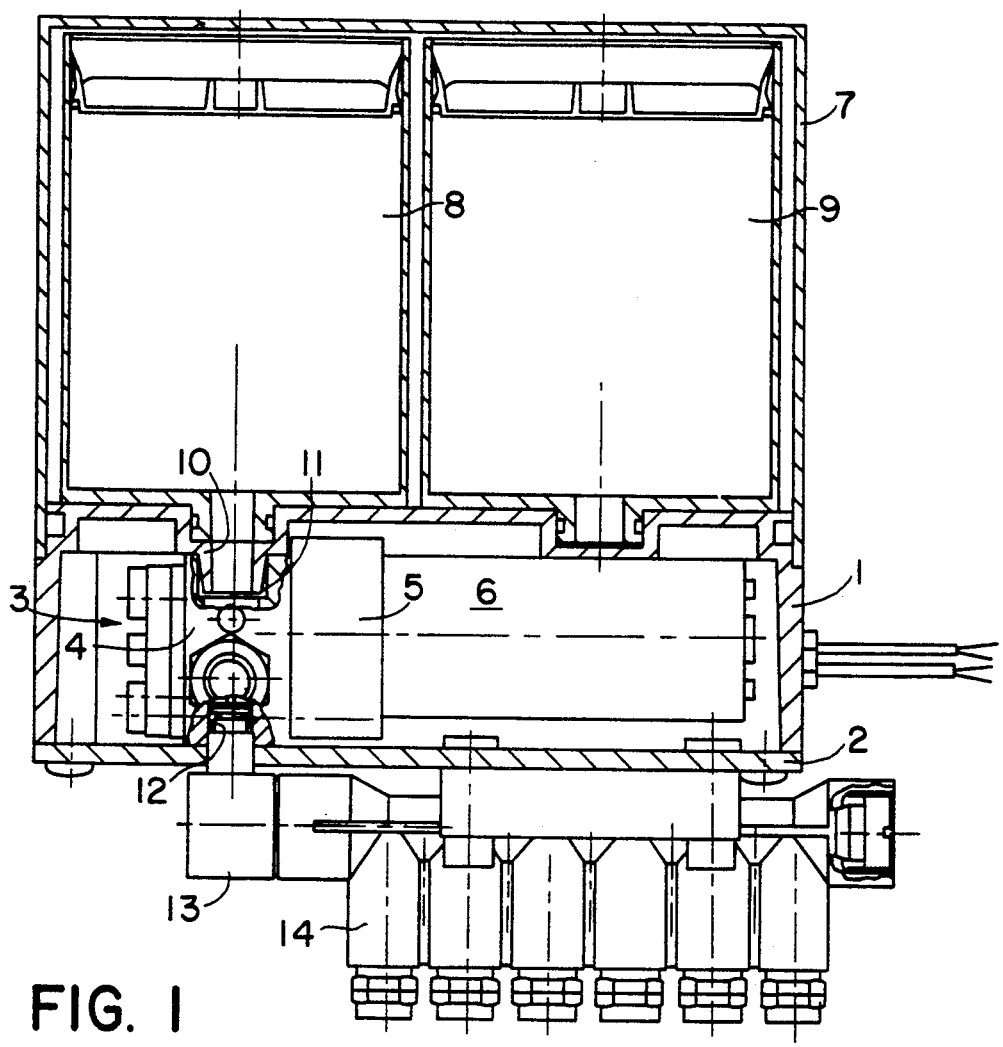
FIG. 1 shows, partially in section, the side view of a central-lubrication assembly.
Figure 2:
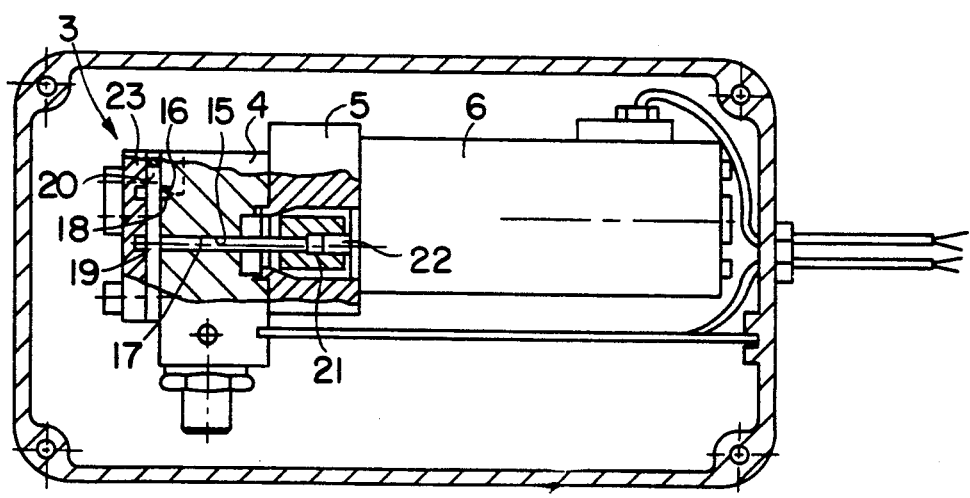
FIG. 2 shows, likewise partially in section, a top view of the lubricant pump and the parts of the central-lubrication assembly according to FIG. 1 which connect it to its drive motor.

In FIG. 1, 1 is a housing which is closed by means of a cover 2 and in which are arranged a lubricant pump 3 designed as a gear pump and the drive motor 6 connected to this via a connecting piece 4 and an intermediate piece 5 and belonging to a central-lubrication assembly. Accommodated above the housing 1, underneath a cowl 7, are two lubricant cartridges 8 and 9 which are filled with fluid grease and one of which is connected via a junction piece 10 to the inlet 11 of the connecting piece 4 designed as a valve block, whilst the other forms a reserve cartridge. A piston-distributor group 14 with six piston distributors is connected via an angle piece 13 to the outlet 12 of the connecting piece 4.

The connecting piece 4 is provided with bores 15 and 16 for receiving shaft butts 17, 18 of the gearwheels 19, 20 of the lubricant pump 3. The shaft butt 17 projects through the connecting piece 4 and is connected in the intermediate piece 5 to the shaft 22 of the drive motor 6 by means of a coupling element 21.

The gearwheels 19, 20 are arranged between a coverplate 23 and the connecting piece 4, which consequently performs the function of the second coverplate otherwise customary in gear pumps.

Figure 3:
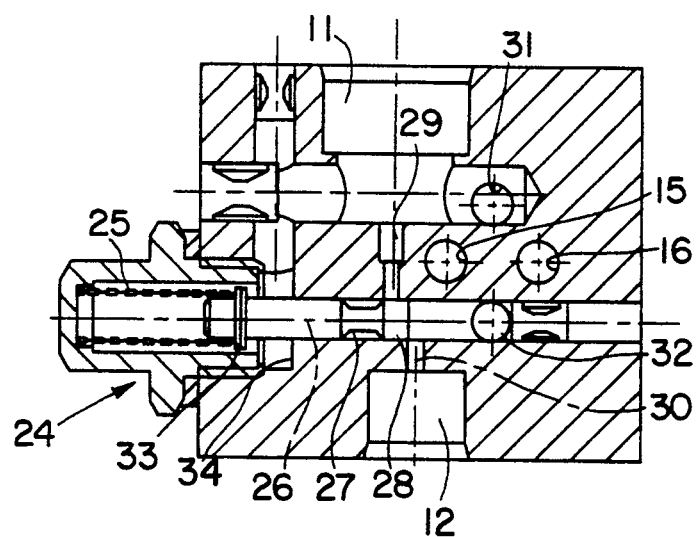
FIG. 3 shows a section through the connecting piece designed as a valve block, between the lubricant pump and its drive motor.

Arranged in the connecting piece, in addition to various lubricant channels, is a combined pressure-relief and pressure-limiting valve 24 which has a piston 26 displaceable to and fro counter to the effect of a return spring 25 and having an annular groove 27. The annular groove 27 separates a piston portion 28 from the rest of the piston 26. In FIG. 3, the piston portion 28 closes a branch channel 29 which, when the system is in the pressure-relieved state, connects the lubricant inlet 11 via the annular groove 27 and a branch channel 30 leading to the lubricant outlet 12. FIG. 3 shows the position of the piston 26 during the supply of lubricant to the piston-distributor group. In this phase, the lubricant pump 3 sucks lubricant out of the lubricant cartridge 8 via a channel 31 and conveys it to the lubricant outlet 12 via a channel 32. If all the piston distributors have been supplied and the pump continues to run, the piston portion 28 is displaced to the left in FIG. 3 and opens the branch channel 29, so that a further pressure rise is prevented. As soon as the lubricant pump 3 is cut off, the return spring presses the piston 26 back into its original position, in which it bears with a collar 33 against the face 34 of the connecting piece 4. The piston distributors now in a known way convey, by a so-called post-lubricating operation, the lubricant stored in them to the respective lubricating point assigned to a piston distributor.

We claim:

1. A central-lubrication assembly for vehicles, with a lubricant pump formed by a gear pump having at least two gearwheels, with a drive motor for the lubricant pump, and with a connecting piece arranged between the lubricant pump and the drive motor; wherein the connecting piece (4) is a valve block which forms a cover plate for the lubricant pump (3) comprising bearings for two shaft butts (17, 18) of the gearwheels (19, 20) of the pump (3), said connecting piece (4) being equipped with a lubricant inlet (11) and a lubricant outlet (12) connected by lubricant channels through which lubricant can flow from the inlet (11) to the pump (3) and from the pump (3) to the outlet (12) via a combined pressure-relief and pressure-limiting valve, said lubricant inlet (11) being coupled in fluid flow relationship to a lubricant container and said lubricant outlet (12) being coupled in fluid flow relationship to a plurality of distributors.

2. A central-lubrication assembly as claimed in claim 1, wherein the lubricant inlet (11) and the lubricant outlet (12) are arranged on side faces of the connecting piece (4) located opposite one another.

3. A central-lubrication assembly as claimed in claim 1, wherein the lubricant inlet (11) and the lubricant outlet (12) are connected via branch channels (29, 30) which can be shut off from one another by means of a piston (26) of the pressure-limiting and pressure relief valve (24), said lubricant inlet (11) and said lubricant outlet (12) being connected via a suction channel (31) in a delivery channel (32) of the lubricant pump (3), said suction and delivery channels (31, 32) forming part of said valve (24).

4. A central-lubrication assembly as claimed in claim 1, wherein the connecting piece (4) is connected to the drive motor (6) via an intermediate piece (5), and wherein the shaft butt (17) assigned to the gearwheel (19) to be driven is connected in the intermediate piece (5) to a shaft (22) of the drive motor (6) by means of a coupling element (21).

* * * * *